(12) United States Patent
Amidei et al.

(10) Patent No.: US 11,539,780 B2
(45) Date of Patent: *Dec. 27, 2022

(54) SYSTEMS AND METHODS FOR QUICK START-UP OF PLAYBACK

(71) Applicant: DIVX, LLC, San Diego, CA (US)

(72) Inventors: William David Amidei, San Diego, CA (US); Jason Braness, San Diego, CA (US); Cristina Dobrin, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 16/932,559

(22) Filed: Jul. 17, 2020

(65) Prior Publication Data

US 2020/0396273 A1 Dec. 17, 2020

Related U.S. Application Data

(63) Continuation of application No. 16/101,339, filed on Aug. 10, 2018, now Pat. No. 10,721,285, which is a
(Continued)

(51) Int. Cl.
*H04L 67/02* (2022.01)
*H04N 21/254* (2011.01)
(Continued)

(52) U.S. Cl.
CPC .......... *H04L 67/02* (2013.01); *H04L 63/0428* (2013.01); *H04L 63/062* (2013.01);
(Continued)

(58) Field of Classification Search
None
See application file for complete search history.

(56) References Cited

U.S. PATENT DOCUMENTS 5,400,401 A 3/1995 Wasilewski et al.
5,574,785 A 11/1996 Ueno et al.
(Continued)

FOREIGN PATENT DOCUMENTS

CA 2237293 A1 7/1997
CN 103493495 A 1/2014
(Continued)

OTHER PUBLICATIONS

Huang et al., "Architecture Design for Deblocking Filter in H.264/JVT/AVC", 2003 International Conference on Multimedia and Expo., Jul. 6-9, 2003, Baltimore, MD, 4 pgs.
(Continued)

*Primary Examiner* — Brandon Hoffman
(74) *Attorney, Agent, or Firm* — KPPB LLP

(57) ABSTRACT

Systems and methods for quick start-up of playback in accordance with embodiments of the invention are disclosed. Media content may be encoded in a plurality of alternative streams and a quick start-up stream. The quick start-up stream may include media content that is encoded at a lower quality that the alternative streams and may be encrypted with a different, less secure encryption process than that of the alternative streams. During a start-up of playback, the playback device streams the media content from a quick start-up stream until a metric, such as a decryption key for the alternative streams is met. The device then streams the media content from the alternative streams in response to the metric being met.

18 Claims, 6 Drawing Sheets

Related U.S. Application Data continuation of application No. 15/085,598, filed on Mar. 30, 2016, now Pat. No. 10,075,292.

(51) Int. Cl.

| | | |
|---|---|---|
| *H04L 9/40* | (2022.01) | |
| *H04N 21/2343* | (2011.01) | |
| *H04N 21/643* | (2011.01) | |
| *H04N 21/845* | (2011.01) | |
| *H04N 21/6334* | (2011.01) | |
| *H04N 21/4402* | (2011.01) | |
| *H04N 21/2347* | (2011.01) | |
| *H04N 21/462* | (2011.01) | |
| *H04L 65/70* | (2022.01) | |
| *H04L 65/75* | (2022.01) | |
| *H04L 65/612* | (2022.01) | |
| *H04L 65/613* | (2022.01) | |

(52) U.S. Cl.
CPC .......... *H04L 65/612* (2022.05); *H04L 65/613* (2022.05); *H04L 65/70* (2022.05); *H04L 65/75* (2022.05); *H04L 65/762* (2022.05); *H04N 21/2347* (2013.01); *H04N 21/23439* (2013.01); *H04N 21/2541* (2013.01); *H04N 21/44029* (2013.01); *H04N 21/4621* (2013.01); *H04N 21/63345* (2013.01); *H04N 21/64322* (2013.01); *H04N 21/8456* (2013.01); *H04L 2209/60* (2013.01)

(56) References Cited

U.S. PATENT DOCUMENTS

| | | |
|---|---|---|
| 5,600,721 A | 2/1997 | Kitazato |
| 5,621,794 A | 4/1997 | Matsuda et al. |
| 5,642,338 A | 6/1997 | Fukushima et al. |
| 5,805,700 A | 9/1998 | Nardone et al. |
| 5,813,010 A | 9/1998 | Kurano et al. |
| 5,854,873 A | 12/1998 | Mori et al. |
| 5,907,658 A | 5/1999 | Murase et al. |
| 5,923,869 A | 7/1999 | Kashiwagi et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,057,832 A | 5/2000 | Lev et al. |
| 6,065,050 A | 5/2000 | DeMoney |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,351,538 B1 | 2/2002 | Uz |
| 6,373,803 B2 | 4/2002 | Ando et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,654,933 B1 | 11/2003 | Abbott et al. |
| 6,671,408 B1 | 12/2003 | Kaku |
| 6,690,838 B2 | 2/2004 | Zhou |
| 6,724,944 B1 | 4/2004 | Kalevo et al. |
| 6,751,623 B1 | 6/2004 | Basso et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,531 B1 | 8/2005 | Takahashi |
| 6,957,350 B1 | 10/2005 | Demos |
| 6,970,564 B1 | 11/2005 | Kubota et al. |
| 6,983,079 B2 | 1/2006 | Kim |
| 7,006,757 B2 | 2/2006 | Ando et al. |
| 7,007,170 B2 | 2/2006 | Morten |
| 7,020,287 B2 | 3/2006 | Unger |
| 7,151,832 B1 | 12/2006 | Fetkovich et al. |
| 7,188,183 B1 | 3/2007 | Paul et al. |
| 7,212,726 B2 | 5/2007 | Zetts |
| 7,274,861 B2 | 9/2007 | Yahata et al. |
| 7,295,673 B2 | 11/2007 | Grab et al. |
| 7,349,886 B2 | 3/2008 | Morten et al. |
| 7,352,956 B1 | 4/2008 | Winter et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,415 B2 | 11/2008 | Reitmeier et al. |
| 7,499,930 B2 | 3/2009 | Naka et al. |
| 7,546,641 B2 | 6/2009 | Robert et al. |
| 7,639,921 B2 | 12/2009 | Seo et al. |
| 7,640,435 B2 | 12/2009 | Morten |
| 7,711,052 B2 | 5/2010 | Hannuksela et al. |
| 7,853,980 B2 | 12/2010 | Pedlow, Jr. et al. |
| 7,864,186 B2 | 1/2011 | Robotham et al. |
| 7,945,143 B2 | 5/2011 | Yahata et al. |
| 8,131,875 B1 | 3/2012 | Chen |
| 8,169,916 B1 | 5/2012 | Pai et al. |
| 8,243,924 B2 | 8/2012 | Chen et al. |
| 8,286,213 B2 | 10/2012 | Seo |
| 8,312,079 B2 | 11/2012 | Newsome et al. |
| 8,369,421 B2 | 2/2013 | Kadono et al. |
| 8,649,669 B2 | 2/2014 | Braness et al. |
| 8,683,066 B2 | 3/2014 | Hurst et al. |
| 8,782,268 B2 | 7/2014 | Pyle et al. |
| 8,819,116 B1 | 8/2014 | Tomay et al. |
| 8,849,950 B2 | 9/2014 | Stockhammer et al. |
| 9,038,116 B1 | 5/2015 | Knox et al. |
| 10,721,285 B2 | 7/2020 | Braness et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0164024 A1 | 11/2002 | Arakawa et al. |
| 2002/0169971 A1 | 11/2002 | Asano et al. |
| 2003/0002577 A1 | 1/2003 | Pinder |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0135742 A1 | 7/2003 | Evans |
| 2003/0142594 A1 | 7/2003 | Tsumagari et al. |
| 2003/0206717 A1 | 11/2003 | Yogeshwar et al. |
| 2004/0001594 A1 | 1/2004 | Krishnaswamy et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0076237 A1 | 4/2004 | Kadono et al. |
| 2004/0081333 A1 | 4/2004 | Grab et al. |
| 2004/0093494 A1 | 5/2004 | Nishimoto et al. |
| 2004/0101059 A1 | 5/2004 | Joch et al. |
| 2004/0107356 A1 | 6/2004 | Shamoon et al. |
| 2005/0013494 A1 | 1/2005 | Srinivasan et al. |
| 2005/0063541 A1 | 3/2005 | Candelore |
| 2005/0076232 A1 | 4/2005 | Kawaguchi |
| 2005/0144468 A1 | 6/2005 | Northcutt |
| 2005/0177741 A1 | 8/2005 | Chen et al. |
| 2005/0243912 A1 | 11/2005 | Kwon et al. |
| 2005/0265555 A1 | 12/2005 | Pippuri |
| 2005/0275656 A1 | 12/2005 | Corbin et al. |
| 2006/0013568 A1 | 1/2006 | Rodriguez |
| 2006/0165163 A1 | 7/2006 | Burazerovic et al. |
| 2007/0047645 A1 | 3/2007 | Takashima |
| 2007/0067472 A1 | 3/2007 | Maertens et al. |
| 2007/0083467 A1 | 4/2007 | Lindahl et al. |
| 2007/0180051 A1 | 8/2007 | Kelly et al. |
| 2008/0086570 A1 | 4/2008 | Dey et al. |
| 2008/0101718 A1 | 5/2008 | Yang et al. |
| 2008/0137847 A1 | 6/2008 | Candelore et al. |

(56) References Cited

U.S. PATENT DOCUMENTS

| | | | |
|---|---|---|---|
| 2008/0279535 | A1 | 11/2008 | Haque et al. |
| 2008/0310454 | A1 | 12/2008 | Bellwood et al. |
| 2009/0010622 | A1 | 1/2009 | Yahata et al. |
| 2009/0013195 | A1 | 1/2009 | Ochi et al. |
| 2009/0077143 | A1 | 3/2009 | Macy, Jr. |
| 2009/0106082 | A1 | 4/2009 | Senti et al. |
| 2009/0178090 | A1 | 7/2009 | Oztaskent |
| 2009/0249081 | A1 | 10/2009 | Zayas |
| 2009/0282162 | A1 | 11/2009 | Mehrotra et al. |
| 2009/0310819 | A1 | 12/2009 | Hatano |
| 2010/0142915 | A1 | 6/2010 | Mcdermott et al. |
| 2011/0010466 | A1 | 1/2011 | Fan et al. |
| 2011/0058675 | A1 | 3/2011 | Brueck et al. |
| 2011/0103374 | A1 | 5/2011 | Lajoie et al. |
| 2011/0135090 | A1 | 6/2011 | Chan et al. |
| 2011/0145858 | A1 | 6/2011 | Philpott et al. |
| 2011/0173345 | A1 | 7/2011 | Knox et al. |
| 2011/0179185 | A1 | 7/2011 | Wang et al. |
| 2011/0197261 | A1 | 8/2011 | Dong et al. |
| 2011/0246661 | A1 | 10/2011 | Manzari et al. |
| 2011/0296048 | A1 | 12/2011 | Knox et al. |
| 2011/0314130 | A1 | 12/2011 | Strasman |
| 2012/0005312 | A1 | 1/2012 | Mcgowan et al. |
| 2012/0042090 | A1 | 2/2012 | Chen et al. |
| 2012/0047542 | A1 | 2/2012 | Lewis et al. |
| 2012/0110120 | A1 | 5/2012 | Willig et al. |
| 2012/0167132 | A1 | 6/2012 | Mathews et al. |
| 2012/0311174 | A1 | 12/2012 | Bichot et al. |
| 2013/0013803 | A1 | 1/2013 | Bichot et al. |
| 2013/0080267 | A1 | 3/2013 | McGowan |
| 2014/0003516 | A1* | 1/2014 | Soroushian ......... H04L 65/4092 375/240.13 |
| 2014/0096269 | A1* | 4/2014 | Amidei ............... H04L 63/062 726/29 |
| 2014/0140253 | A1 | 5/2014 | Lohmar et al. |
| 2014/0149557 | A1 | 5/2014 | Lohmar et al. |
| 2015/0288530 | A1 | 10/2015 | Oyman |
| 2019/0044995 | A1 | 2/2019 | Amidei |

FOREIGN PATENT DOCUMENTS

| | | |
|---|---|---|
| EP | 1453319 A1 | 9/2004 |
| EP | 1283640 B1 | 10/2006 |
| EP | 2180664 A1 | 4/2010 |
| EP | 2360923 A1 | 8/2011 |
| JP | 2007215069 A | 8/2007 |
| JP | 2014529967 A | 11/2014 |
| JP | 7001673 B2 | 12/2021 |
| KR | 20040039852 A | 5/2004 |
| KR | 20060106250 A | 10/2006 |
| RU | 2328040 C2 | 6/2008 |
| SG | 11201808640 | 1/2021 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2009006302 A1 | 1/2009 |
| WO | 2009109976 A2 | 9/2009 |
| WO | 2011087449 A1 | 7/2011 |
| WO | 2011101371 A1 | 8/2011 |

OTHER PUBLICATIONS

Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al., "A Deblocking Filter with Two Separate Modes in Block-based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", researcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.

(56) References Cited

OTHER PUBLICATIONS

Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Information Technology—MPEG Systems Technologies—Part 7: Common Encryption in ISO Base Media File Format Files (ISO/IEC 23001-7), Apr. 2015, 24 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media Filea Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision Jan. 20, 2003, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, October 200, 6 pgs, Oct. 2009.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology—Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.

"OpenDML AVI File Format Extensions Version 1.02", OpenDML AVI MJPEG File Format Subcommittee. Last revision: Feb. 28, 1996. Reformatting: Sep. 1997, 42 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Bocharov et al., "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005, 143 pgs.

(56) References Cited

OTHER PUBLICATIONS

Huang et al., "Adaptive MLP post-processing for block-based coded images", IEEE Proceedings—Vision, Image and Signal Processing, vol. 147, No. 5, Oct. 2000, pp. 463-473.

* cited by examiner

SYSTEMS AND METHODS FOR QUICK START-UP OF PLAYBACK

CROSS-REFERENCE TO RELATED APPLICATIONS

The current application is a continuation of U.S. patent application Ser. No. 16/101,339 filed Aug. 10, 2018, entitled "Systems and Methods for Quick Start-Up of Playback", which application claims priority as a continuation of U.S. patent application Ser. No. 15/085,598 filed Mar. 30, 2016, entitled "Systems and Methods for Quick Start-Up of Playback", the disclosures of which are incorporated by reference herein in their entirety.

FIELD OF THE INVENTION

The present invention generally relates to adaptive streaming and more specifically to streaming systems that include a quick start-up stream for use in beginning playback of media content.

BACKGROUND

The term streaming media describes the playback of media on a playback device, where the media is stored on one or more servers and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

To provide a consistent means for the delivery of media content over the Internet, the International Organization for Standardization (ISO) and the International Electrotechnical Commission (IEC) have put for the Dynamic Adaptive Streaming over HTTP (DASH) standard. The DASH standard specifies formats for the media content and the description of the content for delivery of MPEG content using HTTP. In accordance with DASH, each component of media content for a presentation is stored in one or more streams. Each of the streams is divided into segments. A Media Presentation Description (MPD) is a data structure that includes information about the segments in each of the stream and other information needed to present the media content during playback. A playback device uses the MPD to obtain the components of the media content using adaptive bit rate streaming for playback.

Often, content providers encrypt the data in the streams of media content to protect against unauthorized users accessing and using the media content. Thus, prior to playback, a playback device has to interact with an authentication system to obtain a key that may be used to decrypt the data from the streams. This process of obtaining the key often involves a negotiation process that takes time to complete. As such, the playback device cannot decrypt and playback the media content from a stream until the key is obtained by completing the negotiation process. In some cases, this may delay playback for an unacceptable amount of time.

SUMMARY OF THE INVENTION

Systems and methods for quick start-up of video playback in accordance with embodiments of the invention are disclosed. A process for providing a quick start-up of video playback in accordance with at least some embodiments of the invention is performed in the following manner. A playback device receives information for various of alternative streams of the media content and a quick start-up stream of media content from a content provider system over a network. The media content in the alternative streams is encoded at various bitrates, resolutions, and frame rates and the content in each particular alternative stream has a particular quality based upon at least one of the bitrate, resolution, and frame rate of the particular stream. The quality of media content in the quick start-up stream has a lesser quality than the video content of each of the alternative streams. The playback device commences streaming of the media content in the quick start-up stream from the content provider system over the network. The playback devices determines when a metric has been met by the streaming. In response to the metric being met, the playback device commences streaming of the media content from one of the alternative streams from the content provider system over the network.

In accordance with some embodiments, the alternative streams are encrypted using a first encryption process. In accordance with some of these embodiments the playback device requests a decryption key for the first encryption process from an authentication system over the network in response to receiving the information for the alternative streams. The playback device receives the decryption key for the first encryption process from the authentication system in response to requesting the decryption key and determines that the metric has been met in response to the playback device receiving the decryption key. In accordance with a number of embodiments, the quick start-up stream is encrypted using a second encryption process that is less secure than the first encryption process and the playback device obtains a decryption key for the second encryption process in response to receiving the information for the quick start-up stream using the playback device. The playback device then decodes the media content from the quick start-up stream with the second decryption key in response to receiving the media content in the quick start-up stream. In accordance with a number of embodiments, the second decryption key is read from the information received for the quick start-up stream by the playback device.

In accordance with many embodiments, the playback device obtains the second decryption in the following manner. The playback device reads decryption information for the second encryption process from the information received for the quick start-up key and requests the decryption key from the second encryption process from a content provider system over the network. The decryption key for the second decryption process is then received from the content provider system by the playback device.

In accordance with some embodiments, the playback device determines that the metric is met by determining either that at least one of a specified amount of video content is received using the quick start-up stream or a certain amount of time has elapsed.

In accordance with some embodiments, the playback device determines a specific portion of the media content is a start position for playback of the media content using the playback device and commences streaming the media content from the determined specific portion in the quick start-up stream.

DETAILED DESCRIPTION

Figure 1:
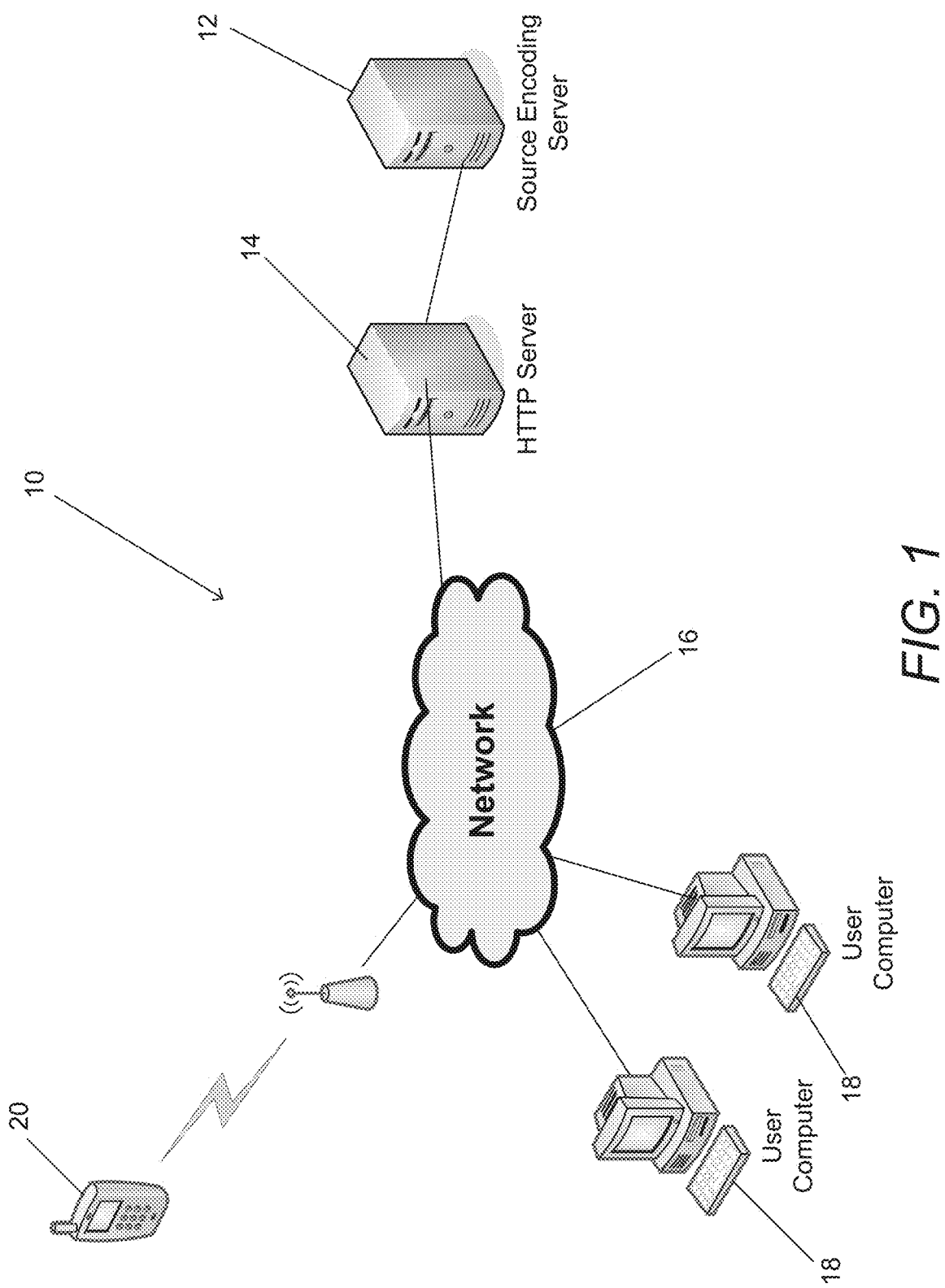
FIG. 1 illustrates a network diagram of an adaptive bitrate streaming system in accordance with an embodiment of the invention.

Turning now to the drawings, systems and methods for quick start-up of the playback of media content in an adaptive bitrate streaming system in accordance with some embodiments of the invention are illustrated. Start-up occurs when the next frame to be played back is not already stored within the buffer of the playback device. Start-up can occur, when a video is started for the first time or when playback is resumed after a non-sequential playback operation is performed, such as a chapter seek or time seek. Thus, a delay in buffering or loading of new media content (to reduce the likelihood of buffer underflow when playback commences) may result in a delay in displaying the new media content. In accordance with some embodiments, start-up is delayed when the encoded media content in the streams is encrypted and the playback device must first negotiate for and receive a decryption key to decode the media content. The delay in the start-up may be on the order of several seconds which is unsatisfactory to a user. To reduce the time needed for start-up, source media is encoded as at least one video stream for normal playback and at least one stream that can be utilized to perform quick start-up for playback of the encoded media in some embodiments of this invention. In order to further reduce the start-up time in some other embodiments, the source media is encoded as a number of alternative streams for adaptive bitrate streaming and at least one additional quick start-up stream. In the quick start-up stream, the source media is encoded in such a way that playback of encoded media from the quick start-up starts faster than playback of the encoded media from the conventional alternative streams. To do so, the quick start-up stream includes a lower quality version of the encoded media in accordance some embodiments. For purposes of this discussion, lower quality means that the encoded media has a lower resolution, bitrate, and/or frame rate than encoded media in another stream. In some other embodiments, the quick start-up stream may include a lower quality version of the encoded media that is encrypted in a different manner than the other alternative streams such that the time to obtain decryption information for the quick start-up stream is less than that of the encryption method used for the other alternative streams. In accordance with a number of these embodiments, the quick start-up stream may not be encrypted in any way. In accordance with some others of these embodiments, the quick start-up stream is encrypted using an encryption process that has a decryption key stored in the playback device and is accessible to the application performing the playback to allow decryption of the media content to commence immediately after the content is received from the quick start-up stream. The quick start-up stream can be utilized to fill the buffer of the playback device with the media content more quickly than the use of one of the conventional alternative stream to allow quicker start-up of playback. In several embodiments, the process of loading the quick start-up stream can involve instantiating a first decoder to decode the start-up stream and tearing down the first decoder and instantiating a second decoder to decode a higher resolution and/or more robustly encrypted stream that is buffered during playback of content by the first decoder.

In accordance with some embodiments, the media content is stored in streams in accordance with the DASH standards. However, one skilled in the art will recognize that the formats such as but not limited to, a Matroska (MKV) container file format may used to store streams of the media content without departing from this invention.

The performance of an adaptive bitrate streaming system in accordance with some embodiments of the invention can be significantly enhanced by encoding each portion of the source video in each of the alternative streams and the quick start-up stream at each bit rate in such a way that the portion of video is encoded in each stream as a single (or at least one) closed group of pictures (GOP) starting with an Instantaneous Decoder Refresh (IDR) frame, which is an intra frame. In many embodiments, the media content in the quick start-up stream is also encoded at a lower bitrate, frame rate and/or resolution than the video content in the other alternative streams to have a lower quality than the media content encoded in the other alternative streams. The playback device can switch between the alternative streams used during normal playback and the quick start-up stream at the completion of the playback of a segment and, irrespective of the stream from which a segment is obtained, the first frame in the segment will be an IDR frame that can be decoded without reference to any encoded media other than the encoded media contained within the Cluster element. Thus, a playback device may switch from receiving media content from the quick start-up stream and perform conventional adaptive bitrate streaming as if the quick start-up stream was any other available stream.

In a number of embodiments, the MPD may contain a decryption key that can be used to decrypt encoded media content in the quick start-up stream or a URL where the decryption key may be obtained. The playback device obtains information concerning each of the available streams from the MPD and selects one or more streams to utilize in the playback of the media. The playback device can then obtain header information from the container files containing the one or more bitstreams or streams, and the headers provide information concerning the decoding of the streams. The playback device can also request index information that indexes segments of the encoded media stored within the relevant container files. The index information can be stored within the container files or separately from the container files in the MPD or in separate index files. The index information enables the playback device to request byte ranges corresponding to segments of the media within the container file containing specific portions of encoded media via HTTP from the server. The playback device uses the index information to request portions of the media content from the quick start-up stream during start-up and then to request portions of the encoded media from the other alternative streams after start-up has completed in accordance with some embodiments. Playback is continued with the playback device requesting portions of the encoded content from a stream having media content that is encoded at a bitrate that can be supported by the network conditions.

The encoding of source video for use in adaptive bitrate streaming systems that provide a quick start-up stream and the playback of the encoded media content using adaptive bit rate streaming in accordance with some embodiments of the invention is discussed further below.

Adaptive Streaming System Architecture

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Device

Figure 2:
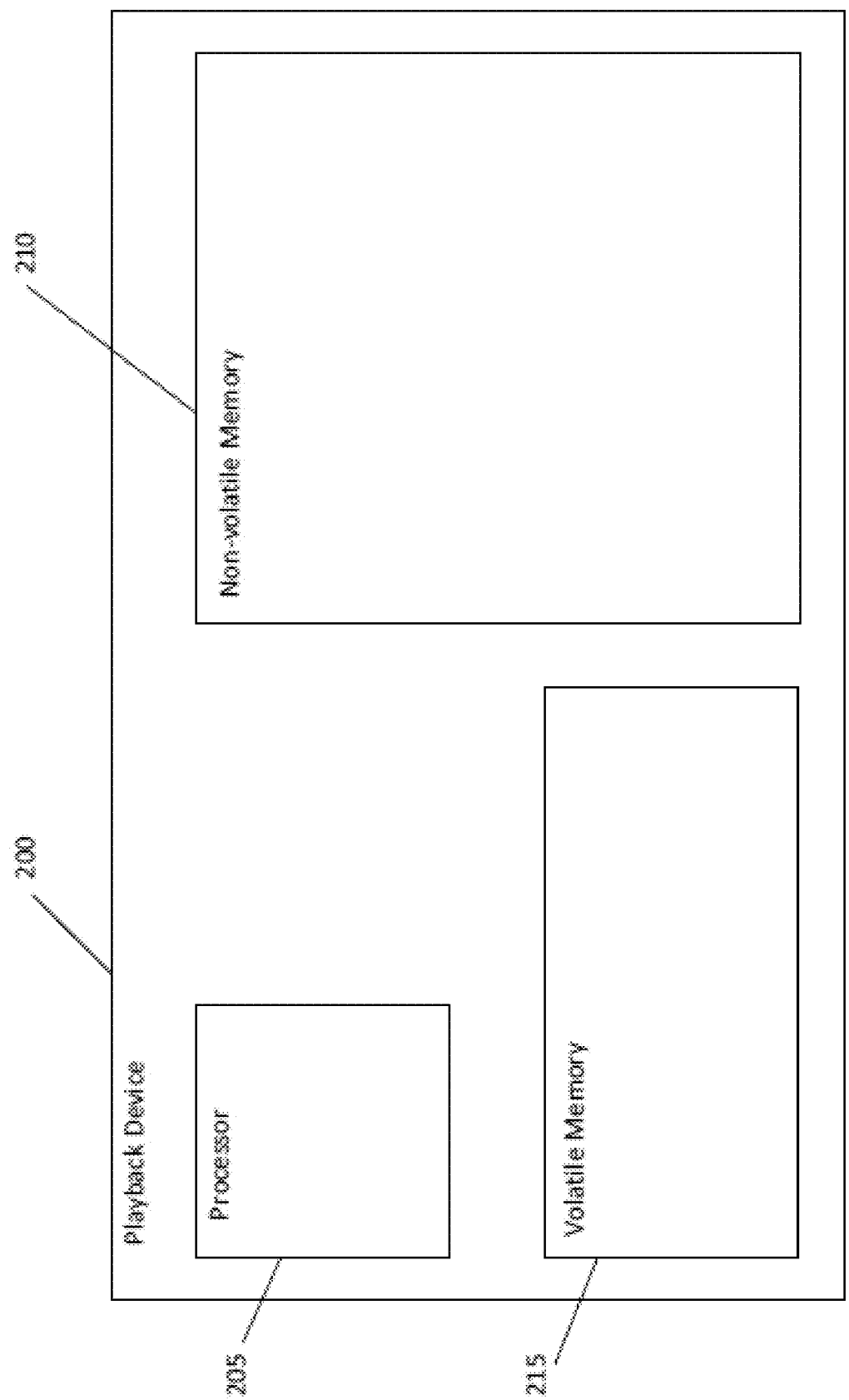
FIG. 2 illustrates a block diagram of components of a processing system such as a processing system in a playback device in accordance with an embodiment of the invention.

Some processes for providing methods and systems in accordance with embodiments of this invention are executed by a playback device. The relevant components in a playback device that can perform processes including adaptive streaming processes in accordance with embodiments of the invention are shown in FIG. 2. One skilled in the art will recognize that playback device may include other components that are omitted for brevity without departing from described embodiments of this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of non-transitory computer readable media appropriate to a specific application.

Servers

Figure 3:
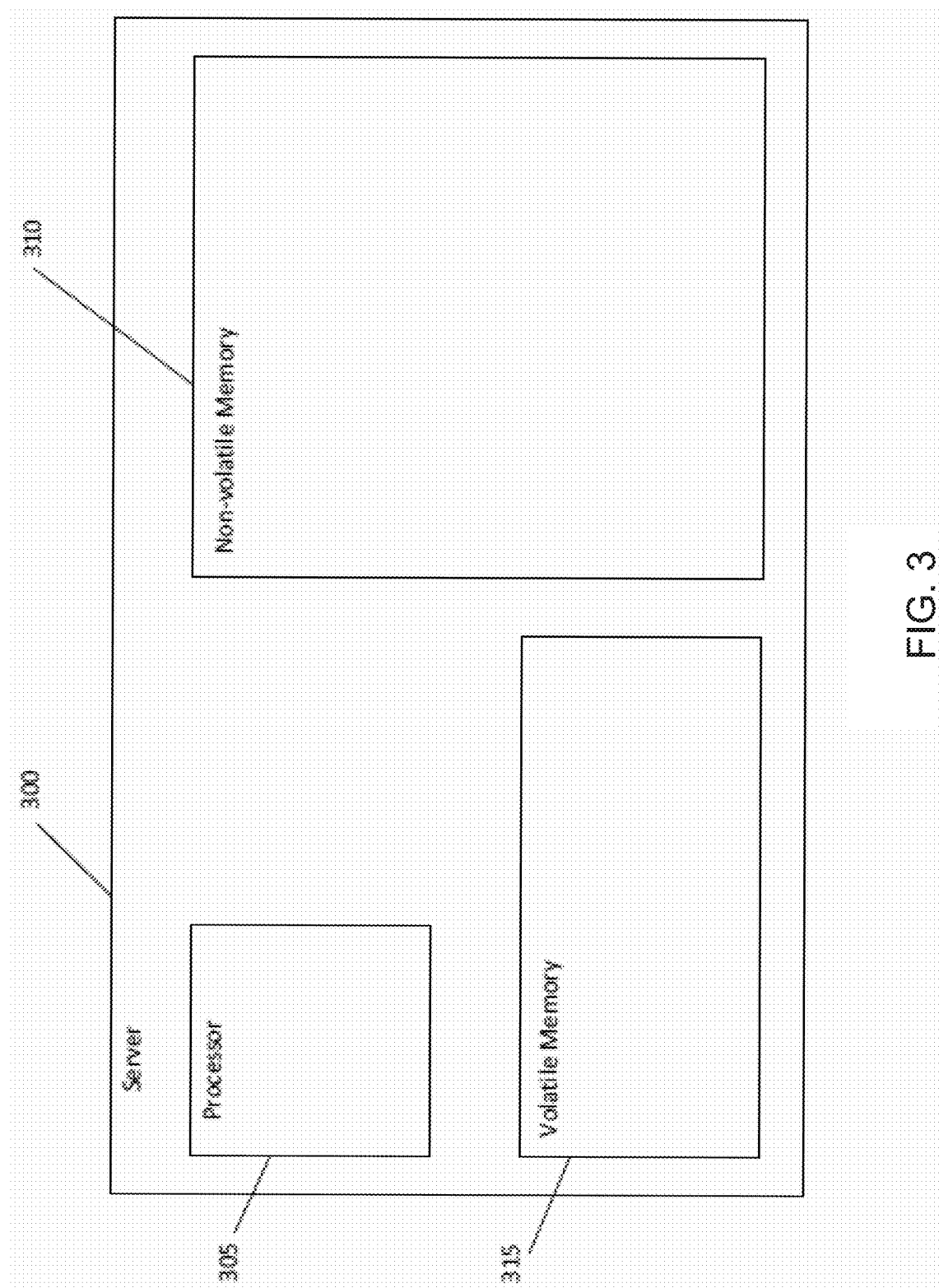
FIG. 3 illustrates a block diagram of components of a processing system such as a processing system in an encoding system, and/or a content provider system in accordance with an embodiment of the invention

Some processes for providing methods and systems in accordance with embodiments of this invention are executed by the HTTP server; source encoding server; and/or local and network time servers. The relevant components in a server that perform the processes in accordance with embodiments of the invention are shown in FIG. 3. One skilled in the art will recognize that a server may include other components that are omitted for brevity without departing from the described embodiments of this invention. The server 300 includes a processor 305, a non-volatile memory 310, and a volatile memory 315. The processor 305 is a processor, microprocessor, controller, or a combination of processors, microprocessor, and/or controllers that performs instructions stored in the volatile 315 or non-volatile memory 310 to manipulate data stored in the memory. The non-volatile memory 310 can store the processor instructions utilized to configure the server 300 to perform processes including processes in accordance with embodiments of the invention and/or data for the processes being utilized. In other embodiments, the server software and/or firmware can be stored in any of a variety of non-transitory computer readable media appropriate to a specific application. Although a specific server is illustrated in FIG. 3, any of a variety of servers configured to perform any number of processes can be utilized in accordance with embodiments of the invention.

Encoding of Quick Start-Up Stream and Alternative Streams

Figure 4:
FIG. 4 illustrates a flow diagram of a process performed by an encoding system to encode streams including encrypted data of the media content in accordance with embodiments of the invention.

A flow diagram of a process for encoding source media content into alternative streams including a quick start-up stream performed by an encoding system in accordance with an embodiment of the invention is shown in FIG. 4. Process 400 includes receiving source media content (405). In accordance with some embodiments, the source media content may include a source media content having a particular resolution, frame rate, and other conventional properties. In accordance with other embodiments, the source media content may include multiple copies of a particular source media content where each copy of the source media content in a set of copies has a different resolution, frame rate and/or other properties to allow the generation of streams that have different properties for use by playback devices that support different media content characteristics.

The encoding system encodes the media content into alternative streams of content (410). In accordance with various embodiments, the alternative streams include one or more streams of the encoded video content. In accordance with some embodiments, the generated alternative streams have varying bitrates, level of quality, and/or content. For example, each alternative stream may have a different bit rate such that each stream can be used when network conditions can support the stream, such as (but not limited to) when network bandwidth exceeds a required bit rate for the stream. Furthermore, different alternative streams may include media content having different aspect ratios, resolutions, and/or frame rates to support different types of playback devices and/or the different bitrates of the streams in accordance with many embodiments.

The generated media content of the streams is encrypted using a first encryption process (415). The encryption of the stream prevents unauthorized users from viewing the media content. In accordance with some embodiments, the first encryption process uses a first key that is more secure than the key used to encrypt the quick start-up stream as discussed further below. One skilled in the art will recognize that any encryption method may be used without departing from the invention. A particular encryption process used in accordance with a number of embodiments of this invention is described in U.S. Pat. No. 8,909,922 entitled "Systems and methods for playing back alternative streams of protected content protected using common cryptographic information" issued to Kiefer et al. on Dec. 9, 2014 the portions relating to the adaptive bit rate streaming of encrypted material is hereby incorporated by reference.

Metadata for each of the alternative streams that includes the information discussed above with reference to container files is generated (417). In accordance with some embodiments, the metadata may include the information relating to properties of the stream included the encoded maximum bitrate of the stream and presentation time information of each chunk; properties of the media content including, but not limited to, resolution, frame rate, and sample aspect ratio. The container file(s) and index file(s) for the alternative streams is generated from the encrypted alternative streams and metadata for the encrypted streams. In accordance with some embodiments, the index files may include a top level index file that includes metadata for each stream and a pointer or URL for each of the alternative streams for use in adaptive bitrate streaming.

One skilled in the art will recognize that although the generating of the streams (410), encrypting of the streams (415), generating of metadata (417), and generation of the container file(s) (420) are shown as separate processes, the processes may be done simultaneously or in different sequences in accordance with some embodiments.

In addition, a quick start-up stream of the media content is generated (425). In accordance with some embodiments, the quick start-up stream includes a low quality version of the media content. In accordance with many of the embodiments, the low quality stream may include only a small portion of the media content, such as the beginning portion of the media content. For example, the quick start-up streams may include only a portion on the order of several seconds to minutes of the beginning portion of the media content to only allow the quick start-up and the beginning of the streaming. Optionally, the encoding system may encrypt the quick start-up data using a second encryption process (430). In accordance with a number of embodiments, the second encryption process is less secure than the first encryption process used for the other alternative streams. For example, the second encryption process may use a simple encryption/decryption key that may be less complex than the encryption/decryption key used in the first encryption process. The metadata for the quick start-up steam is generated (445). In accordance with some other embodiments, the encryption/decryption keys for the second encoding process is stored in the playback device and is available to the application playback the media. In accordance with many embodiments, the metadata generated for the quick start-up streams is the same as or similar to the metadata generated for the alternative streams as described above.

The encoding system then adds the quick start-up stream to a container file and/or generates a container file for the quick start-up stream using the generated stream and/or the generated metadata (450). The container file for the quick start-up stream is the same and/or similar to the container file(s) generated for the alternative streams described above. The metadata for the quick start-up file is also added to the index file(s) for the streams (455). In accordance with some embodiments, the adding of the metadata of the quick start-up stream to the index file(s) includes metadata for the quick start-up stream to a top index file.

The encoding system may also add encryption information for the second encryption process to the index files (460). In accordance with some embodiments, the adding of the encryption information may include adding a decryption key for the second encryption process to an index file that includes the metadata for the quick start-up stream. In accordance with some other embodiments, the adding of the encryption information may include an identifier or a URL for a file containing the decryption key for the second encryption process.

One skilled in the art will recognize that although the generating of the streams (425), encrypting of the streams (430), generating of metadata (445), and generation of the container file (450) are shown as separate processes, the processes may be done simultaneously in accordance with some embodiments. Furthermore, One skilled in the art will recognize that although the generating of the streams (410), encrypting of the streams (415), generating of metadata (417), and generation of the container file(s) (420) are shown as separate from the corresponding process described above for the generating the alternative streams, the processes for the quick start-up stream and alternative streams may be performed simultaneously in accordance with some embodiments.

Although various processes for encoding alternative streams with a quick start-up stream are described above, one skilled in the art will recognize that other processes for encoding streams including a quick start-up stream may be performed in accordance with some embodiments of the invention.

Figure 5:
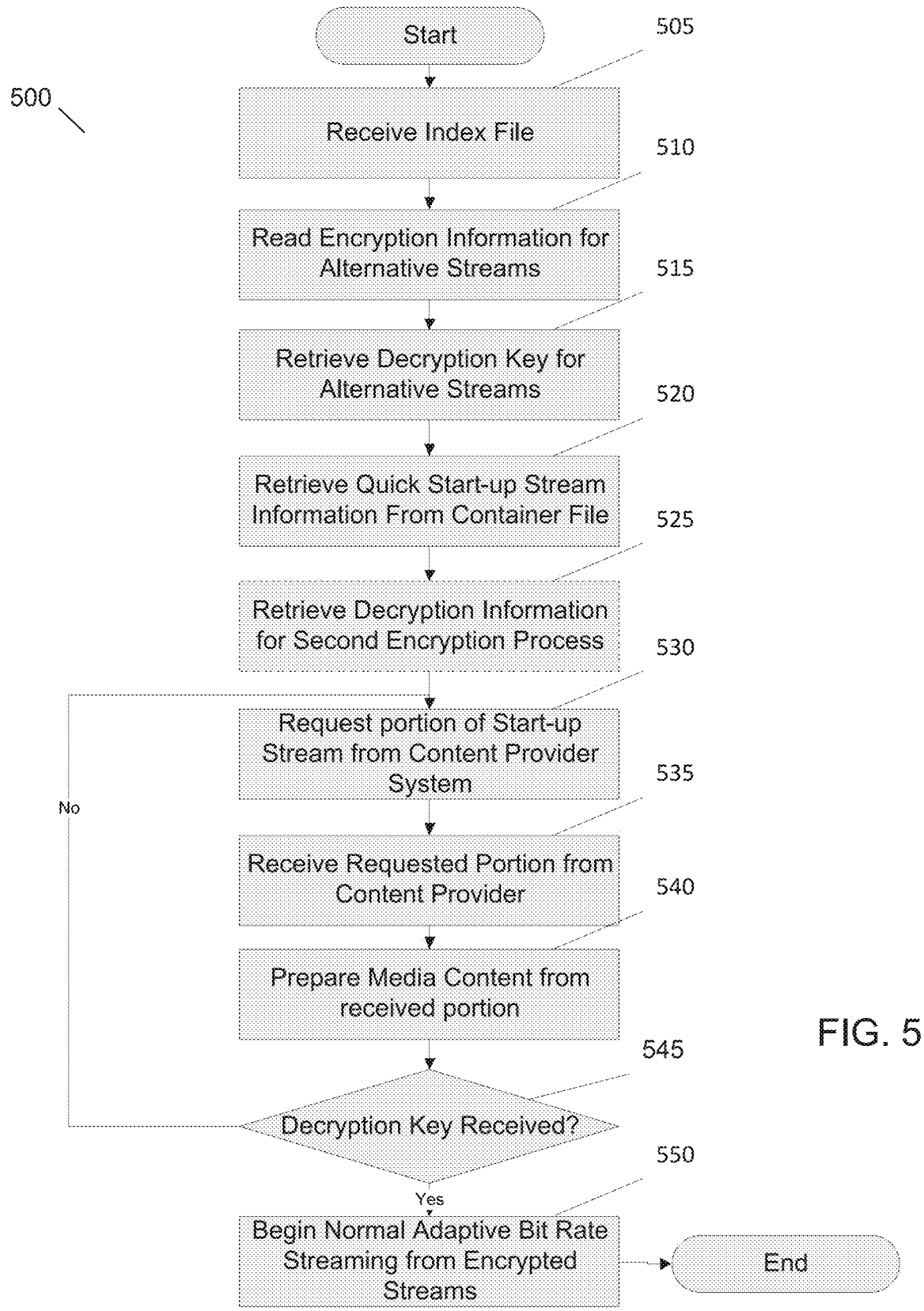
FIG. 5 illustrates a flow diagram of a process performed by a playback device using a start-up stream to begin playback of media content in accordance with an embodiment of the invention.

The quick start-up stream may be used by a playback device to more quickly load, decode, and start playback of media content while the playback device is preparing to decode the media content from the other alternative streams. In some embodiments, the quick start-up stream may be used to playback a beginning portion of the media content while the playback device completes the process of obtaining a decryption key for decrypting and decoding the media content in the other alternative streams. In many embodiments, the quick start-up stream may also be used to obtain media content to fill the buffer the playback device after a trick play command is performed. A process performed by a playback device to begin playback using a quick start-up stream in accordance with an embodiment of the invention is shown in FIG. 5.

In process 500, the playback device begins by receiving a top level index file for the media content (505). The playback device obtains the decryption/encryption information for the alternative streams of the media content (510). In accordance with some embodiments, the decryption/encryption information is read from the top level index file. In accordance with other embodiments, the encryption/decryption information is received from another source. The decryption/encryption information may be an identifier such as a URL or other type of pointer that directs the playback device to an authentication process provided by an authentication system and/or the content provider system. Based upon the decryption/encryption information, the playback device performs a process to obtain a decryption key (515).

The playback device also retrieves the quick start-up stream information from the top level index file (520). In accordance with some embodiments, the quick start-up stream is a URL to a container file containing the encoded video data of the quick start-up stream and/or the index file for the quick start-up stream. In many embodiments, the playback device may also obtain a decryption key or other decryption information from the top level index file, the index file of the quick start-up stream, and/or a decryption file in the container file of the quick start-up stream (525).

The playback device then begins streaming from the quick start-up stream container file. To do so, the playback device requests a portion of the media content (i.e. encoded audio, subtitles, and/or video data) of the quick start-up stream from the quick start-up stream container file (530). In accordance with some embodiments, the playback device begins by request the first portion of the quick start-up stream container file. In a number of embodiments, the playback device begins requesting portions of the quick start-up stream container file at a desired point within the stream such as, but not limited to, a current presentation point in media content after a trick play command has been performed. The playback device receives the requested portion from the container filer on a content provider system (535) and prepares the media content for play back (540). The preparation of the media content for playback may include decrypting the received portion and decoding the media content from the decrypted portion in accordance with many embodiments.

The playback device determines whether the decryption key for the other alternative streams has been received (545). In accordance with some embodiments, another metric may be used instead of or in combination with the reception of the decryption key such as, but not limited to, a specified amount of media content has been received or a predetermined amount of time has elapsed. If the decryption key has not been received and/or another metric has not been met, the playback device repeats the requesting (530), reception (535), and preparation (540) for playback of another portion of the quick start-up stream. If the decryption key has been received and/or another metric has been met, the playback device begins perform streaming with the other alternative streams in a conventional manner (550). Systems and methods for selecting a stream and commencing playback include those disclosed in U.S. Patent Application Publication 2013/0007200 entitled "Systems and Methods for Determining Available Bandwidth and Performing Initial Stream Selection When Commencing Streaming Using Hypertext Transfer Protocol" and U.S. Pat. No. 8,832,297 entitled "Systems and Methods for Performing Multiphase Adaptive Bitrate Streaming," the disclosures of which are hereby incorporated by reference in their entirety more particularly the processes performed by a playback device to obtain media content using adaptive bit rate streaming are incorporated herein by reference.

Although specific processes for starting playback using a quick start-up stream is discussed above with reference to FIG. 5, one skilled in the art will recognize that other processes for starting playback with a quick start-up stream may be performed in accordance with various embodiments of this invention.

Figure 6:
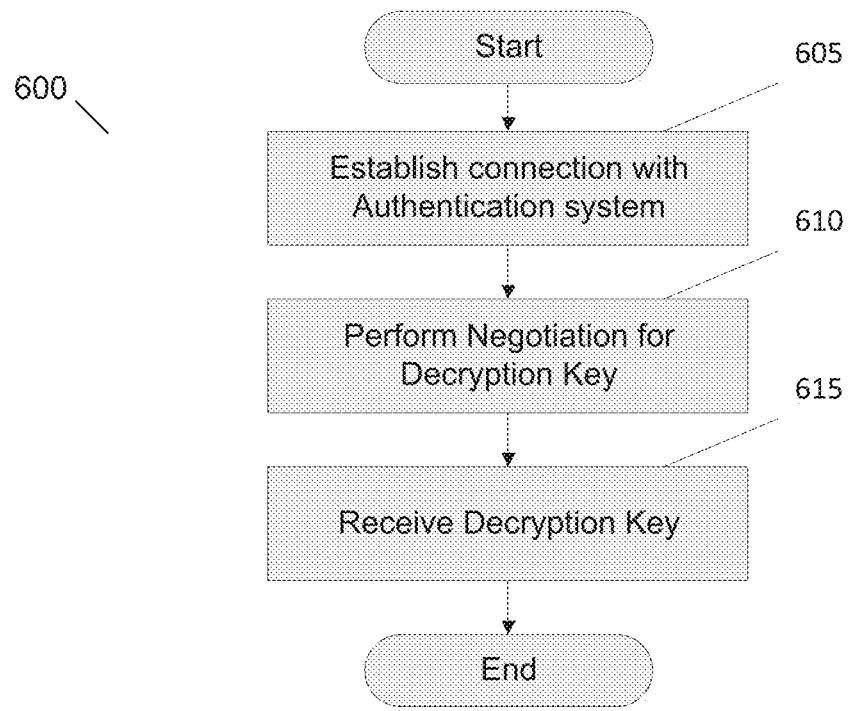
FIG. 6 illustrates a flow diagram of a process performed by a playback device to obtain an encryption key in accordance with an embodiment of the invention.

In order to obtain the decryption key for the alternative streams a playback device must negotiate for the key with the content provider system and/or a third party authentication system. A process performed by a playback device in accordance with an embodiment of this invention is shown in FIG. 6. Process 600 includes establishing connection with an authentication system (605). In accordance with some embodiments, the established connection is a secure connection over the network to assure confidential information cannot be obtained by third parties. The playback device then interacts with the authentication system to negotiate for the decryption key (610). In accordance with many embodiments, the negotiation may include the playback device providing certified and/or registration information to the authentication system and the authentication system verifying the information to authorize the playback device. Once the playback device is authorized, the authentication system provides the decryption key to playback device that receives the decryption key over the secure connection (615).

Although specific processes for obtaining a decryption key in accordance with an embodiment of the invention is disclosed in FIG. 6, other processes may be performed by a playback device to obtain a decryption key in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method for fast startup of video playback of encoded media content using a quick start-up stream of media content and a plurality of alternative streams of the media content, the method comprising:
    receiving, at a playback device, information for a quick start-up stream of media content stored in a first container file and information for a plurality of encrypted alternative streams of the media content stored in a second container file from a content provider system over a network, where the plurality of encrypted alternative streams are encoded at various bitrates and the media content in each particular stream of the plurality of encrypted alternative streams has a particular quality based upon at least the bitrate of the particular stream and the quality of media content in the quick start-up stream has a lesser quality than the video content of each of the plurality of encrypted alternative streams;
    requesting a decryption key for decrypting at least one encrypted alternative stream of the plurality of encrypted alternative streams from an authentication system over the network using the playback device;
    commencing streaming of the media content in the quick start-up stream from the first container file from the content provider system over the network using the playback device based on the received information for the quick start-up stream; and
    upon receiving the decryption key, commencing streaming of media content in one of the plurality of encrypted alternative streams from the second container file from the content provider system over the network using the playback device based on the received information for the plurality of encrypted alternative streams.

2. The method of claim 1, wherein at least one stream of the plurality of encrypted alternative streams is encrypted using a first encryption process and the quick start-up stream is encrypted using a second encryption process that is less secure than the first encryption process and the method further comprises:
    obtaining a decryption key for the second encryption process in response to receiving the information for the quick start-up stream using the playback device; and
    decoding the media content from the quick start-up stream with the second decryption key using the playback device in response to receiving the media content in the quick start-up stream.

3. The method of claim 2, wherein the second decryption key is read from the information received for the quick start-up stream by the playback device.

4. The method of claim 2, wherein obtaining the second decryption key comprises:
    reading decryption information for the second encryption process from the information received for the quick start-up key using the playback device;
    requesting the decryption key from the second encryption process from a content provider system over the network using the playback device; and
    receiving the decryption key for the second decryption process from the content provider system in the playback device.

5. The method of claim 1 further comprising:
    determining a specific portion of the media content is a start position for playback of the media content using the playback device; and
    wherein the playback device commences streaming the media content from the determined specific portion in the quick start-up stream.

6. The method of claim 1, wherein commencing streaming of media content in one of the plurality of encrypted alternative streams comprises switching to the one of the plurality of encrypted alternative streams at the completion of the playback of a segment of the quick start-up stream.

7. A playback device comprising:
    a memory;
    a network interface; and
    a processor that reads instructions stored in the memory that direct the processor to:
        receive, at the playback device, information for a quick start-up stream of media content stored in a first container file and information for a plurality of encrypted alternative streams of the media content stored in a second container file from a content provider system over a network, where the plurality of encrypted alternative streams are encoded at various bitrates and the media content in each particular stream of the plurality of encrypted alternative streams has a particular quality based upon at least the bitrate of the particular stream and the quality of media content in the quick start-up stream has a lesser quality than the video content of each of the plurality of encrypted alternative streams;
        request a decryption key for decrypting at least one encrypted alternative stream of the plurality of encrypted alternative streams from an authentication system over the network using the playback device;
        commence streaming of the media content in the quick start-up stream from the first container file from the content provider system over the network using the playback device based on the received information for the quick start-up stream; and
        upon receiving the decryption key, commence streaming of media content in one of the plurality of encrypted alternative streams from the second container file from the content provider system over the network using the playback device based on the received information for the plurality of encrypted alternative streams.

8. The playback device of claim 7, wherein at least one stream of the plurality of encrypted alternative streams is encrypted using a first encryption process and the quick start-up stream is encrypted using a second encryption process that is less secure than the first encryption process and the method further comprises:

obtaining a decryption key for the second encryption process in response to receiving the information for the quick start-up stream; and decoding the media content from the quick start-up stream using the second decryption key in response to receiving the media content in the quick start-up stream.

9. The playback device of claim 8, wherein the second decryption key is read from the information received for the quick start-up stream.

10. The playback device of claim 8, wherein the instructions direct the processor to obtain the second decryption key by:

reading decryption information for the second encryption process from the information received for the quick start-up key;

requesting the decryption key from the second encryption process from a content provider system over the network; and receiving the decryption key for the second decryption process from the content provider system.

11. The playback device of claim 7 wherein the instructions further direct the processor to:

determine a specific portion of the media content is a start position for playback of the media content; and wherein the playback device commences streaming the media content from the determined specific portion in the quick start-up stream.

12. The playback device of claim 7, wherein the instructions direct the processor to commence streaming of media content in one of the plurality of encrypted alternative streams by switching to the one of the plurality of encrypted alternative streams at the completion of the playback of a segment of the quick start-up stream.

13. A non-transitory machine readable medium containing processor instructions, where execution of the instructions by a processor causes the processor to perform a process comprising:

receiving information for a plurality of encrypted alternative streams and a quick start-up stream of media content from a content provider system over a network, where the plurality of encrypted alternative streams are encoded at various bitrates, resolutions, and frame rates and the media content in each particular stream of the plurality of encrypted alternative streams has a particular quality based at least one of the bitrate, resolution of, and frame rate of the particular stream and the quality of media content in the quick start-up stream has a lesser quality than the video content of each of the plurality of encrypted alternative streams, wherein the plurality of encrypted alternative streams are encrypted using an encryption process;

request a decryption key for an encryption process from an authentication system over the network using a playback device in response to receiving the information for the plurality of encrypted alternative streams;

commencing streaming of the media content in the quick start-up stream from a content provider system over the network;

determining a metric has been met upon receiving the decryption key for the decryption process from the authentication system; and commencing streaming of media content in one of the plurality of encrypted alternative streams from a content provider system over the network in response to a determination that the metric has been met.

14. The non-transitory machine readable medium of claim 13, wherein at least one stream of the plurality of encrypted alternative streams is encrypted using a first encryption process and the quick start-up stream is encrypted using a second encryption process that is less secure than the first encryption process and the process further comprises:

obtaining a decryption key for the second encryption process in response to receiving the information for the quick start-up stream; and decoding the media content from the quick start-up stream using the second decryption key in response to receiving the media content in the quick start-up stream.

15. The non-transitory machine readable medium of claim 14, wherein the second decryption key is read from the information received for the quick start-up stream.

16. The non-transitory machine readable medium of claim 14, wherein obtaining the second decryption key comprises:

reading decryption information for the second encryption process from the information received for the quick start-up key;

requesting the decryption key from the second encryption process from a content provider system over the network; and receiving the decryption key for the second decryption process from the content provider system.

17. The non-transitory machine readable medium of claim 13, wherein the process further comprises:

determining a specific portion of the media content is a start position for playback of the media content; and wherein the streaming the media content commences from the determined specific portion in the quick start-up stream.

18. The non-transitory machine readable medium of claim 13, wherein commencing streaming of media content in one of the plurality of encrypted alternative streams comprises switching to the one of the plurality of encrypted alternative streams at the completion of the playback of a segment of the quick start-up stream.

* * * * *